(12) United States Patent
Schlecht et al.

(10) Patent No.: US 6,427,751 B1
(45) Date of Patent: Aug. 6, 2002

(54) REAR WINDOW SHADE

(75) Inventors: Werner P. Schlecht, Vaihingen/Enz; Holger Seel, Aidlingen; Herbert Walter, Ebersbach, all of (DE)

(73) Assignee: BOS GmbH & Co. KG (DE)

( * ) Notice: Subject to any disclaimer, the term of this patent is extended or adjusted under 35 U.S.C. 154(b) by 0 days.

(21) Appl. No.: 09/916,426

(22) Filed: Jul. 27, 2001

(30) Foreign Application Priority Data

Aug. 25, 2000 (DE) .......................................... 100 41 708

(51) Int. Cl.[7] .................................................. B60J 1/18

(52) U.S. Cl. .................................. 160/370.22; 160/310

(58) Field of Search ............................... 160/370.22, 70, 160/71, 68, 66, 72, 78, 310, 311, DIG. 2, DIG. 3; 296/97.8, 97.7, 97.4

(56) References Cited

U.S. PATENT DOCUMENTS

| 4,836,263 A | * | 6/1989 | Ament | .......................... 160/68 |
| 6,189,948 B1 | * | 2/2001 | Lin | ..................... 160/370.22 X |
| 6,216,762 B1 | * | 4/2001 | Lin | ......................... 160/370.22 |

* cited by examiner

*Primary Examiner*—David M. Purol
(74) *Attorney, Agent, or Firm*—Leydig, Voit & Mayer, Ltd.

(57) ABSTRACT

An automobile rear window shade 9 having a windup roller (15) rotatably seated in a housing (13) in the automobile. The windup roller (15) is pre-stressed in the wind-up direction of the window shade web (17) by a spring (16). Two pivot levers (19, 21), which are pivotably seated on the housing (13), are provided for unrolling the window shade web (17). Couplings (31) between the pivot levers (19, 21) and a gear motor (29) are provided for operating the pivot levers (19, 21). The couplings (31) are flexible over sections of their length, and to prevent kinking of the flexible sections kink-protection structures 44 are provided.

21 Claims, 5 Drawing Sheets

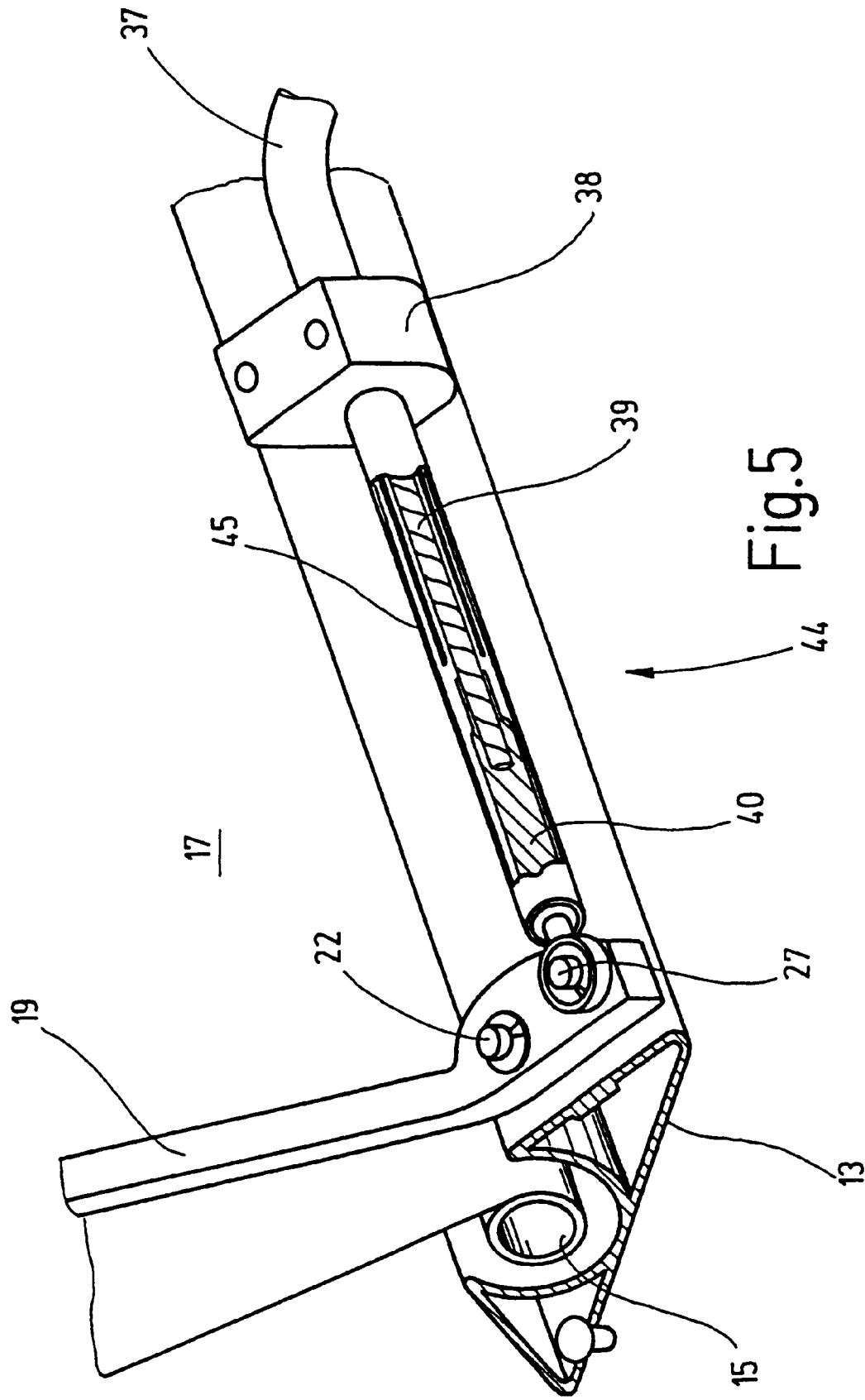

REAR WINDOW SHADE

FIELD OF THE INVENTION

The present invention relates to retractable and extendable window shades, and more particularly, to window shades having particular use with the rear window of an automobile.

BACKGROUND OF THE INVENTION

A rear window shade operating without guide devices is known from EP 0 240 747. With the known rear window shade, the windup roller, which is pre-stressed by a spring, is rotatably seated in a housing on or under the rear-window shelf. The window shade web is fastened by one edge on the windup roller, and its other edge, extending parallel with the first, is connected with a pull rod. The pull rod stiffens the respective edge of the window shade web at the same time.

To unroll the window shade web and to maintain it in the unrolled state, two pivot levers are seated next to the windup roller. The free end of the two rigid pivot levers slidingly engages the pull rod. The window shade web is pulled off the windup roller against the force of a spring by pivoting the pivot levers and is unrolled. At the same time the pivot levers support this edge of the window shade in every operating position and, working together with the windup roller, which is pre-stressed by a spring, keep the window shade web unrolled.

The levers have extensions for pivoting them, which project past the pivot shaft. Coupling rods, which are used as crank arms, act on these extensions, whose other end is also coupled with a crank, which can be selectively caused to rotate by means of an electric motor.

In another embodiment disclosed in the aforesaid reference, a wheel provided with teeth is connected, fixed against relative rotation, with the pivot levers. The teeth of the wheel engage a perforated tape, which is sufficiently rigid to be pushed and is guided in a C-shaped rail. The C-shaped rail must be conducted around the toothed wheel at an appropriate radial distance so that the engagement between the perforated tape and the teeth of the toothed wheel is assured.

In the past, both arrangements have proven well in commerce. However, they do have the disadvantage that the drive motor must be installed approximately in the center between the pivot shafts of the levers, and the crank, on which the rods act, or the respective toothed wheel for the perforated tape, have to be located in the same plane as the toothed wheels of the pivot levers, or their drive cranks. This inevitably necessitates a considerable space requirement at a particular location next to the windup roller.

OBJECTS AND SUMMARY OF THE INVENTION

Based on the foregoing, it is the object of the present invention to provide a window shade, wherein the drive motor can be placed at any arbitrary location.

With the window shade in accordance with the invention, the drive mechanism for the actuating element is operatively connected with the actuating element via flexible coupling means. Because of this it is possible to select the position of the respective drive mechanism, an electric motor as a rule, freely inside the vehicle. It is no longer necessary to house the drive motor between actuating elements in the form of the pivot levers. Instead, the drive motor can be mounted set apart in a side area of the vehicle, where its housing has sufficient space because of the hollow spaces which necessarily exist between the outer body and the inner paneling. It can also be arranged on the other side of the windup roller.

Although as a rule the connection between the coupling means and the respective actuating element is selected in such a way that essentially tensile forces occur in the coupling means, pressure forces are unavoidable at the end of the retracting movement. In the course of the retracting movement of the window shade, the spring drive of the windup roller acts in the direction wherein the respective actuating means are pivoted back into a position, in which the actuating means essentially lie parallel with the windup roller. The drive motor only needs to provide a small pulling force for this pivot movement, if the levers still extend comparatively steeply, i.e. at right angles in respect to the windup roller. The pulling force changes into a pushing force toward the end of the pivot movement, if care is taken that the pivot levers are completely pivoted back into the position of rest. In the course of this it may be necessary to overcome a resistance which is created when rollers attached to the pull rod pass by the housing slit of the window shade. The rollers are intended to prevent damage to the heating wires on the inside of the rear window. The restoring force of the spring in the windup roller is not sufficient for them to move past the slit edge, it is instead necessary to fold the levers back by the force of the drive motor.

Depending on the embodiment, the mechanical blockage of a further pivot movement achieved after folding them back is also used for stopping the motor. Subsequently the motor current is automatically switched off after a preselected period of time, or it is switched off if its value exceeds a preselected threshold.

So that the flexible coupling means do no become kinked under a pressure load, kink-protection means are additionally provided and are used for guiding a section located on one end of the core and extending out of the flexible sleeve in a manner secure against kinking in every operational position.

Depending on the design, the anti-kinking guidance can be provided in the area of the actuating element, as well as in the area of the drive mechanism. Particularly in the case, where the electromechanical drive device, which is connected with the coupling means, operates with the aid of a crank drive, it is practical when the core is provided with such kink-protection means on both ends of the coupling means.

Different structures may embody the kink-protection means. In one embodiment, the end of the core is rigidly connected with a tube, through which the core is coaxially conducted, and which extends over the sleeve of the Bowden cable. In order to achieve the desired guidance action, the sleeve of the Bowden cable can be rigidly designed in any area where this stiffening tube extends over the sleeve. In this case the sleeve and the tube connected with the core act like a telescope. The stiffened end of the sleeve in this instance can also be an individual rigid tube. The sleeve of the Bowden cable is attached to one end of this tube.

Alternatively, the end of the core itself may be rigid. To this end, the core can terminate in a rigid or kink-resistant rod, which is appropriately guided.

For moving the core back and forth, the core can have teeth, for example at the end toward the motor, which are engaged by a toothed wheel of the drive motor.

Either simple levers, whose free ends slidingly engage the pull rod, are used as actuating means for unrolling the window shade web, or toggle levers, whose free end is connected with the pull rod via a hinge shaft. The one-piece levers, as well as the inner toggle lever arm, have an extension projecting past the pivot shaft, on which the coupling means act. By means of this the coupling means may remain inside the housing in every pivoted position of the actuating element, i.e. remain covered by the slit.

As in the prior art, a spring, which is coupled, fixed against relative rotation, with the windup roller, can be used to put the windup roller into motion. The windup roller is pre-stressed in the winding direction of the window shade web by means of the spring.

Other objects and advantages of the invention will become apparent upon reading the following detailed description and upon reference to the drawings, in which:

BRIEF DESCRIPTION OF THE DRAWINGS

FIG. 5 is a fragmentary perspective of still a further alternative embodiment.

Figure 1:
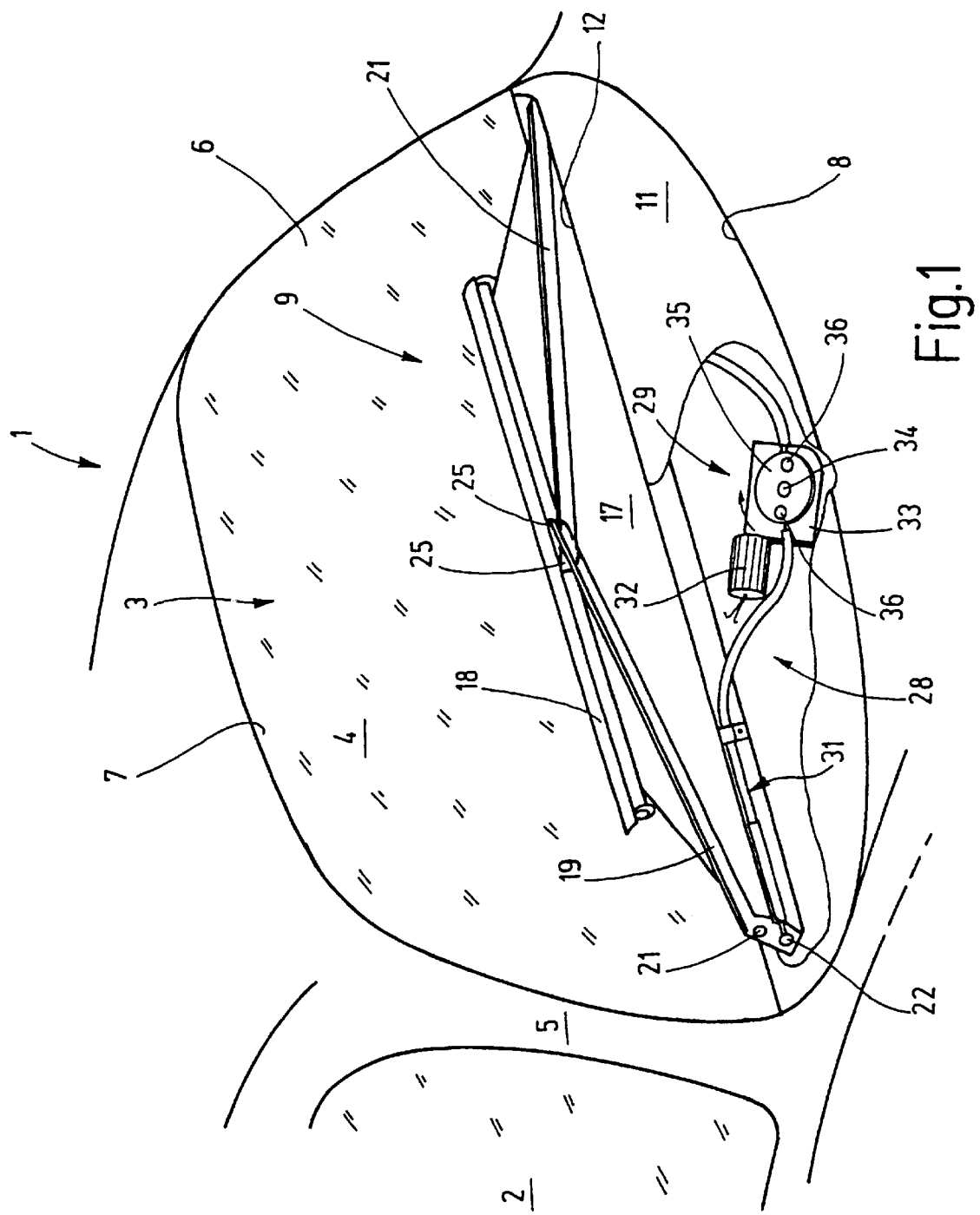
FIG. 1 is a rear perspective of an automobile having a rear window shade in accordance with the invention.

While the invention is susceptible of various modifications and alternative constructions, a certain illustrated embodiment thereof has been shown in the drawings and will be described below in detail. It should be understood, however, that there is no intention to limit the invention to the specific form disclosed, but on the contrary, the intention is to cover all modifications, alternative constructions and equivalents falling within the spirit and scope of the invention.

DETAILED DESCRIPTION OF THE PREFERRED EMBODIMENTS

Referring now more particularly to FIG. 1, there is shown a motor vehicle 1 having side and rear windows 2, 4, respectively. The rear window includes an inserted window glass 4, which is customarily curved, and which in this case is located between two lateral C-pillars 5, 6. The window glass 4 is bordered at the top by a rear roof edge 7 and at the bottom by an edge 8. A window shade 9, which is shown in a partially pulled-out position, is located in front of the inside of the window glass 4.

A rear-window shelf 11, shown in a partially broken representation, in which an outlet slit 12 is contained which extends over almost the entire width of the rear-window shelf 11, is located in the interior of the vehicle in front of the rear window 3. The rear-window shelf 11 fills the area between a rear seatback and the rear window 3.

Figure 2:
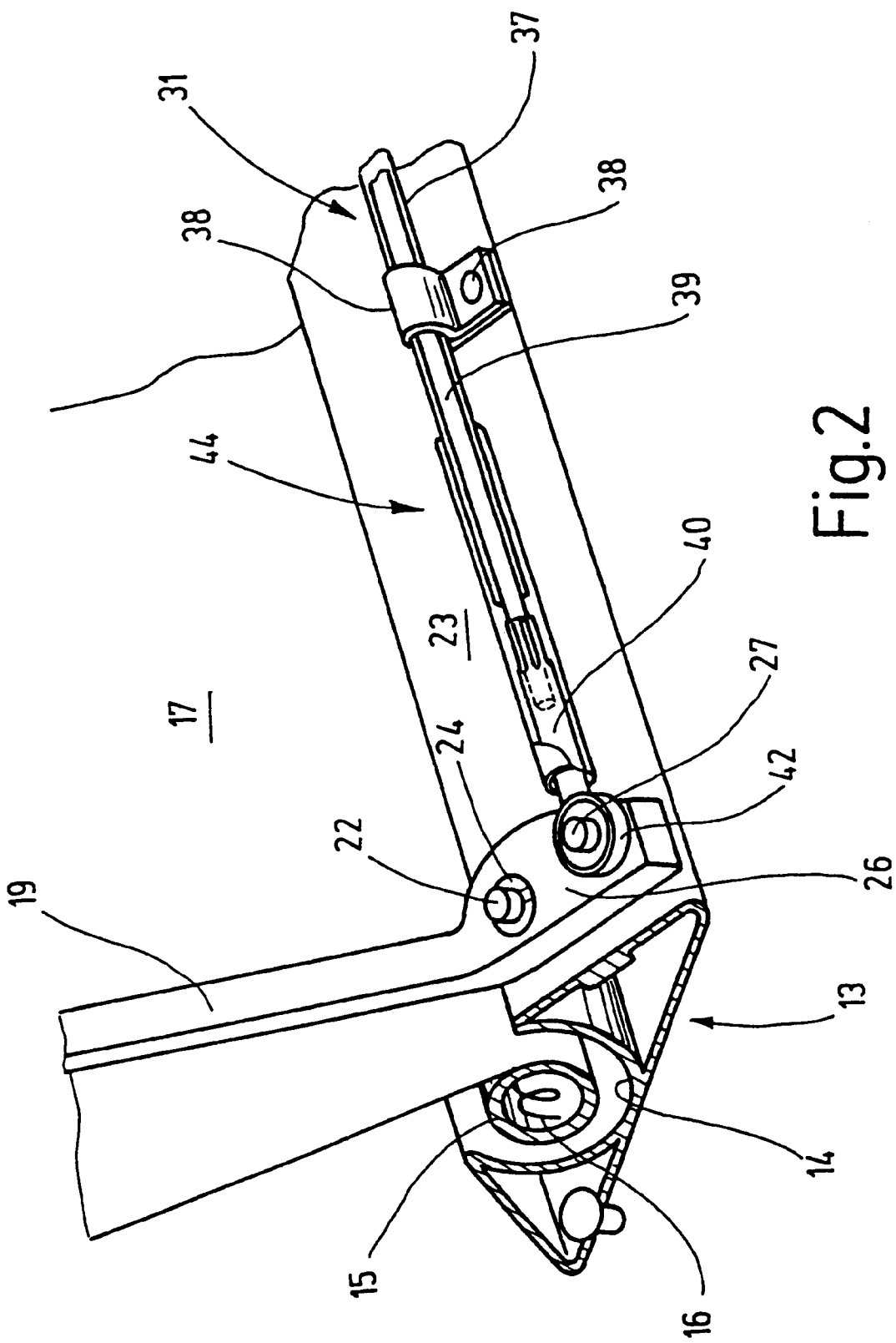
FIG. 2 is an enlarged fragmentary perspective of a portion of the window shade shown in FIG. 1.

The window shade 9 includes a housing 13 in the shape of an extruded profile of approximately triangular cross section fastened below the rear-window shelf 11, as shown in FIG. 2. A cylindrical groove 14, open at the top, in which a windup roller 15 is rotatably seated, is contained in the housing 13, which extends over the entire width of the window shade 9. The windup roller 15 is seated on appropriate journals fastened in end areas of the housing 13.

The windup roller 15 is pre-stressed in one direction of rotation by means of a windup spring 16, whose one end is anchored on the adjacent housing end area and the other end is connected to the windup roller 15. The helical spring 16 is used as spring drive.

A window shade web 17, which has been cut approximately trapezoidally, is fastened with an edge on the windup roller 15. The edge of the window shade web 17 remote from the windup roller 15 and extending parallel with it is connected with a pull rod 18, which at the same time has the purpose of stiffening the respective edge of the window shade web 17. As shown in FIGS. 1 and 2, the window shade web 17 is led upward out of the cylindrical groove 14, and from there, through the outlet slit 12.

Two actuating elements in the form of pivot levers 19, 21 are provided for unrolling the window shade web 17 and to keep it unrolled. As shown by the broken area in FIG. 1, or by the left end of the window shade 9 represented in FIG. 2, each one of the two levers 19, 21 is pivotably seated on the respective end of the housing 13 by means of an associated pivot journal 22. The pivot journal 22 is fastened on a rearward oriented flat housing surface 23. In the installed state, the housing surface 23 extends parallel in respect to a plane defined by the rear window glass 4. The two levers 19, 21 pivot in this way in the plane, namely in opposite directions, since each one of them is seated on one of the two ends of the housing 13.

For rotatable seating, the journal 22 projects through an appropriate bore in the lever 19, 21, which is axially secured on the journal 22 with the aid of a ball clip 24. A guide projection 25 at the end of each of the levers 19, 21 remote from the pivot journal 22 slides in an associated groove, open toward the bottom. The grooves extend in the longitudinal direction of the pull rod.

To pivot the levers 19, 21, each of the two levers 19, 21 is provided with a lever extension 26, as can be seen in connection with the lever 19, which extends in the radial direction past the pivot journal 22, viewed from the direction of the actuating element 19. The lever extension 26 supports a crank journal 27, which has an axis parallel with the journal 22.

A drive mechanism 28, part of which is a gear motor 29, as well as two flexible coupling means 31, is provided so that the two pivot levers 19, 21 can be pivoted in the direction of retraction and extension of the window shade web 17. The gear motor 29 in this instance comprises a permanently excited d.c. motor 32 and a reduction gear 33, on whose output shaft 34 a disk 35 is seated, fixed against relative rotation, and supporting two crank journals 36, which have axes parallel with the output shaft 34.

Figure 3:
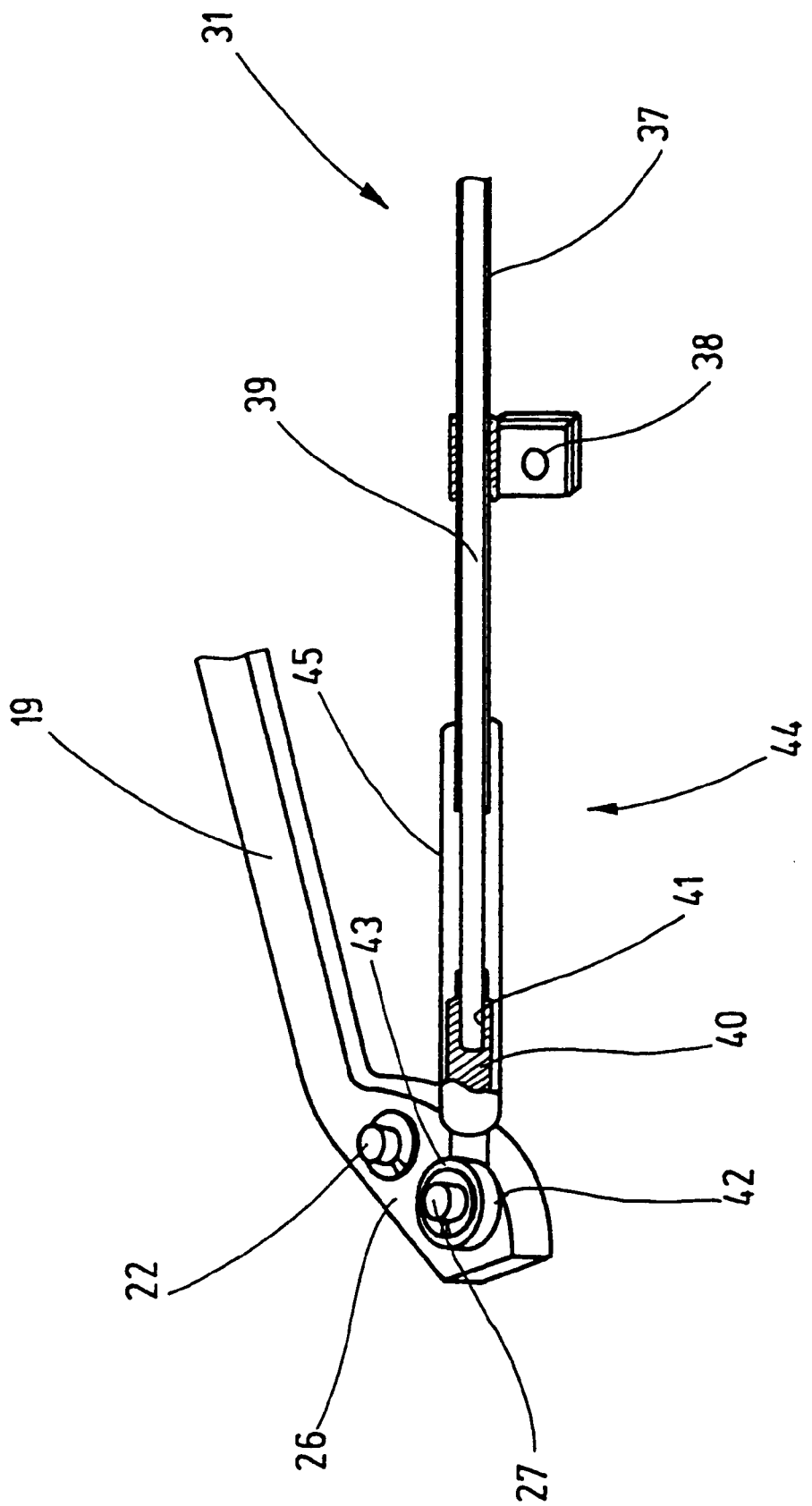
FIG. 3 is a fragmentary perspective of the pivot actuating lever for the window shade shown in FIG. 2.

The coupling means 31 has an end connected to the actuating lever 19, as depicted in FIG. 3. The coupling means 31 has, as is customary in connection with Bowden cables, a flexible hose-like sleeve 37, which is reinforced by a steel spiral, if required. In the vicinity of its respective end, the flexible sleeve 37 is fastened on the housing 13 by means of a clamp 38. The other end of the sleeve 37 is fastened in a similar manner on the gear 33. However, for reasons of clarity this fastening is not further shown. Essentially it looks the same as shown in connection with the lever end in FIG. 3. A core 39 is housed in a freely displaceable manner in the sleeve 37 and is embodied as a solid wire, for example of plastic.

A rod 40, containing a blind bore 41 extending coaxially with the rod 40, is seated on the free end of the core 39 for connecting the core 39 with the crank journal 27. The respective free end of the core 39 has been plugged into the blind bore 41. After the insertion of the core 39, the rod is squeezed or crimped in the area of the bore 41, so that a permanent frictional connection between the rod 40 and the core 39 is provided. The end of the rod 40 remote from the core 39 has a ring eye 42, which is connected to the crank journal 27 and is secured there by means of a ball clip 43 or other suitable means.

Since, as explained above, it is necessary at the end of the retracting movement to transmit pressure forces from the coupling means 31, the danger arises that the coupling means 31 becomes kinked in the area between the clamp 38 and the crank journal 27. To prevent this, kink-protection means 44 are provided.

In the exemplary embodiment represented in FIG. 3, the kink-protection means 44 consist of a kink-resistant tube 45, in which the rod 40 extends coaxially. At the respective end, the tube 45 is rigidly and non-displaceably connected with the rod 40, and on the other end it projects telescope-like over the sleeve 37 of the coupling means 31 from the outside, as shown. The connection between the coupling means 31 and the gear motor can be designed in the same way as is represented in FIG. 3 for the connection with the pivot lever 19.

The arrangement operates as follows:

In the state of rest, the window shade web 17 is rolled up to a large extent on the windup roller 15. Over its length, the pull rod 18 covers the outlet slit 12. In this position, the two levers 19, 21 extend essentially parallel with the longitudinal extension of the windup roller 15. The lever extensions 26 are in their position which is stretched farthest toward the outside. This in turn means that the respective end of the core 39 is pushed the farthest outward out of the flexible sleeve 37.

If, starting at the position of rest, the user wants to unroll the window shade web 17 in order to protect the vehicle against solar radiation from the outside, the motor 32 is put into operation by means of an appropriate electrical switch, not represented, so that the disk 35 performs a limited rotating motion.

The rotating motion is selected in such a way that the ends of the cores 39 of the two coupling means 31, which adjoin each other in the gear motor 29, are moved toward each other. By means of this a pulling force is transmitted to the respective lever extension 26, which tries to pivot the two lever extensions 26 toward each other. This pivot movement leads to a rise of the pivot levers 19, 21. They move from a position parallel with the windup roller 15 into a mostly raised position, in the course of which they are pivoted out of the outlet slit 12 toward the outside.

In the course of the pivot movement, their guide projections 25 slide toward the respective end of the pull rod 18 and conduct the pull rod 18 away from the outlet slit 12. In the process the window shade web 17 is simultaneously unrolled from the windup roller 15 against the effect of the helical spring 16. The end of the pivot movement is reached when the guide projections 25 have arrived at the respective ends of the pull rod 18. The two pivot levers 19, 21 come up against a mechanical blockage, because the guide groove is closed in this area. The arrangement has been made sufficiently stiff so that the force and torque exerted by the gear motor 29 in the blocked state cannot damage the coupling means and the pivot levers 19, 21.

After a predetermined length of time the motor current is switched off by an appropriate timer control, not further represented. It is assured that the length of time after which the current is switched off is sufficient for unrolling the window shade web 17 completely. The gear motor 29 has an automatic interlock, so that the extended position, which was reached after the current for the gear motor 29 has been shut off, remains.

For retraction, the gear motor 29 is started in the opposite direction. In the course of the reversed direction of rotation, the outer ends of the cores 29 are pushed outward, or it is made possible for them to move outward.

Whether the coupling means 31 transmit pressure forces in the course of retraction of the levers 19, 21, or continue to be stressed by tension, depends on the angular position the levers 19, 21 had in the fully extended position. The more steeply the levers 19, 21 extend, the smaller the torque which the spring drive 16 can exert on the levers 19, 21 via the window shade web 17. With the levers 19, 21 extending extremely steeply, it is possible that it would be necessary for the coupling means 31 to provide a pressure force already at the start of the retraction movement, while with comparatively flat extending pivot levers 19, 21 the coupling means 31 rather slow down a too rapid retraction, than actively cause pivoting-in movements, even at the start of the retraction. In any case, there will be a pivot range of the pivot levers 19, 21, in which the spring drive 16 generates a noticeable force on the windup roller 15 in order to move the pivot levers 19, 21 in the direction toward their rest position. In this range the pivoting-in movement is controlled via the gear motor 29, which acts as a brake.

The force of the spring drive 16 is not sufficient for bringing the pivot levers 19, 21 completely into their position of rest, or for moving possibly projecting resilient guide elements downward through the outlet slit 12. In this case the required torque is provided by the gear motor 29, for which purpose it is necessary to transmit a pressure force via the coupling means 31. The pressure force can be transmitted without kinking between the fastening points of the tube 45 of the respective coupling means 31, i.e. in the area between the clamp 38 and the corresponding clamp, not represented, near the gear motor 29.

The kink-protection means 44 is provided so that no kinking will occur between the clamp 38 and the crank journal 27. In any operational position it projects for a sufficient distance on the outside over the flexible sleeve 37 and, together with the relatively stiff, but flexible sleeve 37, it prevents a lateral kinking of the core 39. The same effect is achieved at the end of the coupling means 31 near the motor.

It will be understood that the clamp 38 is arranged as closely as possible near the free end of the flexible sleeve 37 but, on the other hand, is at a sufficient distance from the free end so that it does not interfere with the complete lift which the tube 45 performs along the flexible sleeve 37. In this case it is necessary, even in the fully extended state, that there be a sufficient overlap between the tube 45 and the flexible sleeve 37 in order to effectively prevent possible lateral kinking. This is achieved by the cooperation between the tube 45 and the flexible outer sleeve 37, which is clearly more kink-resistant than the core 39 guided through it.

The kink-protection device 44 does not prevent the required pivot movements of the coupling means in the area between the clamp 38 and the lever extension 26, when the latter runs through its arc from the position of rest to the fully unrolled position of the window shade web 17.

Figure 4:
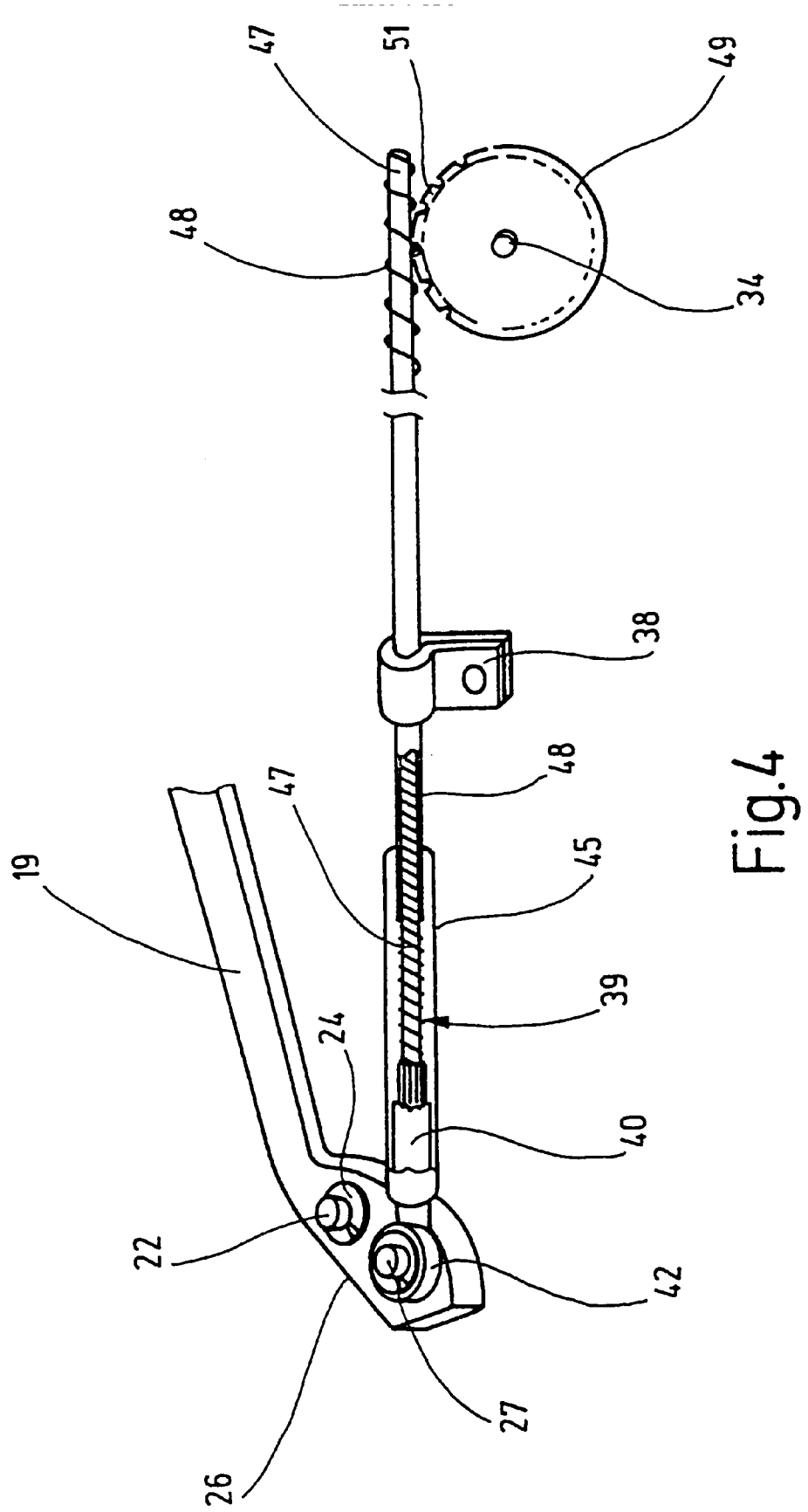
FIG. 4 is a perspective, similar to FIG. 3, but showing an alternative embodiment.

The exemplary embodiment in accordance with FIG. 4 differs from the exemplary embodiment in accordance with FIG. 3 in the type of the core 39. While in the previously explained exemplary embodiment the core 39 consisted of a sturdy solid wire, for example made of polyamide, and was of one piece, the core 39 in accordance with FIG. 4 is a so-called SU-flex shaft. It is composed of a core 47 and a wire 48, which encloses the core 47 in a helical manner. The helically extending wire 48 is fixedly seated on the core 47 and forms a single- or multi-thread screw on the exterior of the core 47. The individual windings of the screw are at a distance from each other which is greater than the diameter of the wire 48 constituting the screw. Because of this, a screw-like toothed device is created on the exterior of the core 39.

The manner in which the core 39 designed in this way is driven is shown greatly schematized and enlarged on the left in FIG. 4. In place of the disk 35 with the two crank journals 36, a toothed wheel 49 with teeth 51, whose pitch at the outer circumference corresponds to the distance between the windings of the helically applied wire 48, has been placed, fixed against relative rotation, on the output shaft 34. The windings formed by the wire 48 interlockingly engage the spaces between the teeth 51. With the aid of a guide device, not represented, the core 39 is maintained resting tangentially on the toothed wheel 49 in order to assure engagement.

Since the guide device extends directly to the circumference of the toothed wheel 49, there is no danger that the core 39 will become kinked there. But conditions are different in the area between the clamp 38 and the lever extension 26, because of which the end of the core 39, embodied as SU-flex shaft™, is provided there with the kink-protection device 44 in accordance with FIG. 3. The connection between the core 39 and the respective crank journal 27 is designed in accordance with the embodiment in FIG. 3.

The kink-protection device 44 also can be designed in accordance with FIG. 5. Here, one end of the tube 45 is fixedly anchored in a clamp 38 embodied as a clamping block. The flexible sleeve 37 leads into the tube 45 for an appropriately short distance on the side of the clamping block 38. The sleeve 37 is clamped in the tube 45 in an axially immovable manner.

Diverging from the previous exemplary embodiment, the tube 45 is not connected with the rod 40. Instead, the rod 40 is freely displaceable with a little radial play in the tube 45. So that the kink-protection effect is achieved, the rod 40 is designed to have sufficient length in order to provide a sufficient overlap between the rod 40 and the tube 45 in every operational position. In the exemplary embodiment in accordance with FIG. 5, the core 39 is embodied as a smooth cord.

With all the exemplary embodiments represented there is the possibility for housing the gear motor 29, set apart from the housing 13 of the window shade 9, at any arbitrary location. Unlike in the prior art, the gear motor 29 no longer needs to be attached directly to the housing 13 essentially between the two journals 22. By means of the novel solution it becomes possible to reduce the space requirement underneath the rear-window shelf 11 by placing the motor into an area where it is no longer in the way, i.e. in a dead space which exists anyway, for example at the side of the housing 13 toward the vehicle interior, or also in a recess on the lateral wall between the outer body and the inner paneling.

It is also possible to employ two toggle levers in place of the one-piece pivot levers 19, 21, which slidingly cooperate with the pull rod 18. Each one of the toggle levers is composed of two arms, which are connected with each other via a hinge joint. The set-off arm is connected with the pull rod 18 by means of a further hinge, while the arm which adjoins the windup roller 15 is seated and driven in the same manner as the pivot lever 19, or 21, of the disclosed exemplary embodiment.

A windup roller 15 of a rear window shade 9 is rotatably seated in a housing 13. The windup roller 15 is pre-stressed in the wind-up direction of the window shade web 17 by means of a spring 16. Two pivot levers 19, 21, which are pivotably seated on a housing 13, are provided for unrolling the window shade web 17. The geared connection between the pivot levers 19 and 21 and a gear motor 29 is provided by means of Bowden cables, or coupling means 31, which are flexible over an area of their length. To prevent kinking at the free end, kink-protection means 44 are provided there.

What is claimed is:

1. A window shade (9) comprising, a rotatably mounted windup roller (15), a window shade web (17) having one edge fastened to the windup roller (15) and another edge parallel to the windup roller and fastened to a pull rod (18), at least one actuating element (19, 21) pivotably mounted adjacent to said windup roller (15) and having an end connected to said pull rod (18), a first drive (16) connected to the windup roller (15) for selectively rotating the windup roller, a second drive (29) connected to the at least one actuating element (19, 21), at least one coupling (31) which is flexible over at least a section of its length, said coupling element 31 including an outer sleeve (37) and a core (39) which is longitudinally displaceable within the sleeve (37) and connects the second drive (29) with the at least one actuating element (19, 21), and a kink-protection structure along a section of the at least one coupling (31) adjacent an end thereof for guiding movement of the core and preventing kinking of the core.

2. The window shade of claim 1 in which a kink-protection structure further is provided along a section of the at least one coupling adjacent the second drive (29).

3. The window shade of claim 1 in which the kink-protection structure includes a rigid tubular element (45) connected to an end of the core (39) and extending over the sleeve (37) in telescope-like manner.

4. The window shade of claim 1 in which the kink-protection structure (44) has a rigid end section (40) connected to the core (39).

5. The window shade of claim 4 in which the rigid end section (40) of the kink-protection structure is disposed inside the sleeve (37).

6. The window shade of claim 4 in which the rigid end section is disposed inside a rigid tube 45 to which said sleeve (37) terminates.

7. The window shade of claim 4 in which the rigid end section (40) includes a rod whose end is connected with the flexible section of the core (39).

8. The window shade of claim 4 in which the flexible section of the core (39) is connected with the rigid end section (40) by means of a crimped connection.

9. The window shade of claim 1 in which said core (39) consists of a cord.

10. The window shade of claim 1 in which said core (39) includes a flexible wire.

11. The window shade of claim 1 in which said core (39) has a toothed section (48) adjacent the second drive.

12. The window shade of claim 11 in which the flexible section of the core (39) has a linear section (47) with a helically wound wire (48) connected on the exterior thereof which defines teeth.

13. The window shade of claim 1 in which the window shade web (17) is supported in a pulled-out position solely by the actuating elements (19, 21) free of guide rails.

14. The window shade of claim 1 in which the at least one actuating element (19, 21) is a simple lever.

15. The window shade of claim 14 in which the lever (19, 21) has a pivot axis and an extension which extends beyond the pivot axis and against which the coupling (31) acts.

16. The window shade of claim 14 in which the at least one actuating element is a toggle lever which includes inner and outer toggle lever arms connected together by a hinge joint, and said inner toggle lever arm is pivotally mounted at the windup roller (15).

17. The window shade of claim 16 in which the inner toggle lever arm has an extension (26) projecting beyond the pivot axis to which the coupling (31) is connected.

18. The window shade of claim 1 in which the first drive is a spring.

19. The window shade of claim 18 in which the spring 16 is coupled to the windup roller (15) and pre-stresses the windup roller in a roll-up direction of the window shade.

20. The window shade of claim 1 in which said first drive (29) includes at least one gear motor.

21. The window shade of claim 20 in which the second drive (20) includes a gear motor.

\* \* \* \* \*